Aug. 25, 1970  R. K. H. GEBEL  3,525,571
ANALYZER FOR DETERMINING SPATIAL DEVIATIONS IN THE SPECTRAL
RESPONSE OF PHOTOSENSORS
Filed Oct. 16, 1964  4 Sheets-Sheet 3

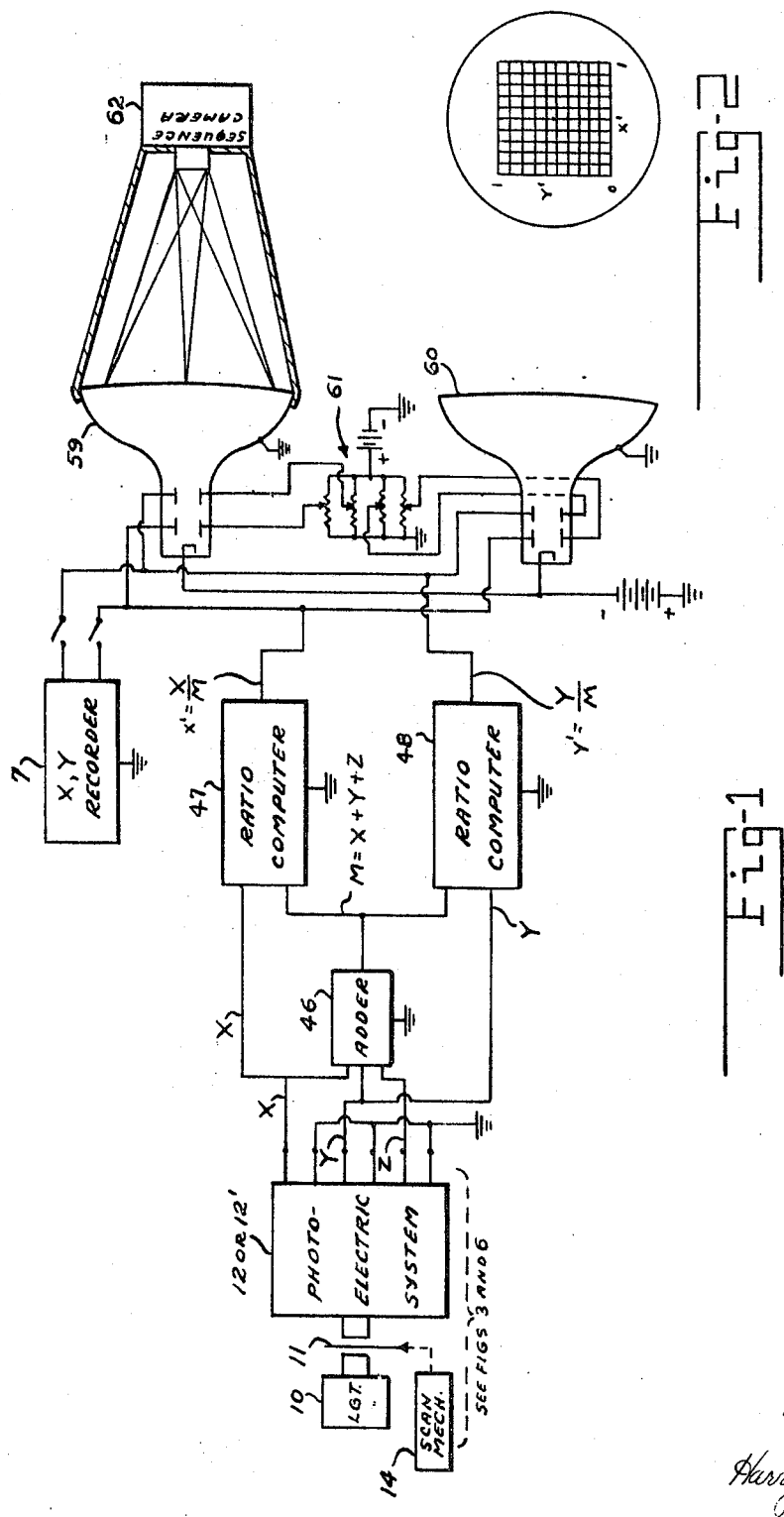

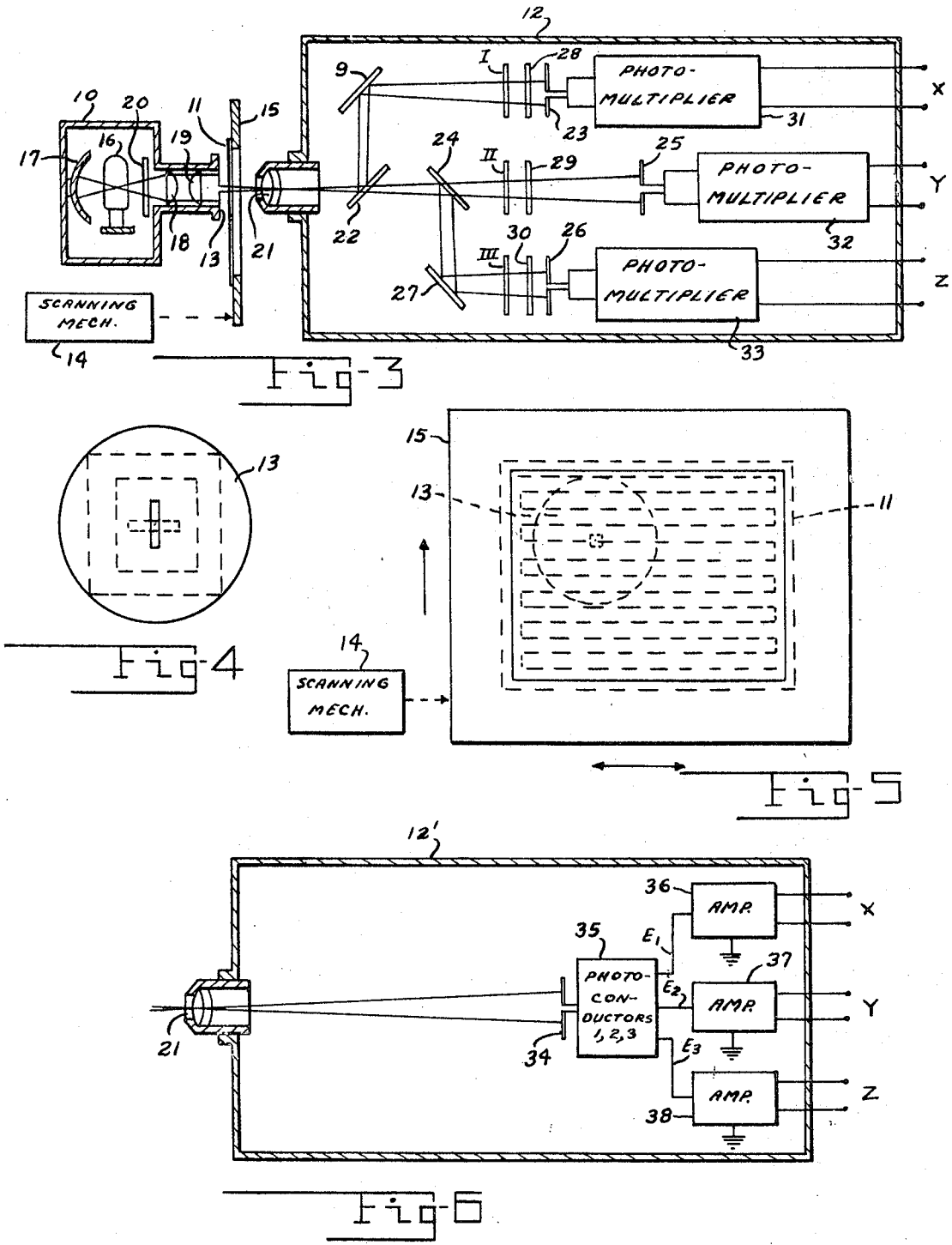

INVENTOR
R.K.H. GEBEL

Harry A. Herbert Jr.
ATTORNEY

BY

James S. Shannon
AGENT

Aug. 25, 1970  R. K. H. GEBEL  3,525,571
ANALYZER FOR DETERMINING SPATIAL DEVIATIONS IN THE SPECTRAL
RESPONSE OF PHOTOSENSORS
Filed Oct. 16, 1964  4 Sheets-Sheet 4

INVENTOR
R.K.H. GEBEL

Harry A. Herbert Jr.
ATTORNEY

BY James S. Shannon
AGENT

United States Patent Office 3,525,571
Patented Aug. 25, 1970

3,525,571
ANALYZER FOR DETERMINING SPATIAL DEVIATIONS IN THE SPECTRAL RESPONSE OF PHOTOSENSORS
Radames K. H. Gebel, Dayton, Ohio, assignor to the United States of America as represented by the Secretary of the Air Force
Filed Oct. 16, 1964, Ser. No. 404,540
Int. Cl. G01j 3/46, 3/48; G01n 21/22
U.S. Cl. 356—176                                    4 Claims

ABSTRACT OF THE DISCLOSURE

Method and apparatus for testing photosensors for spatial uniformity of spectral response. The method comprises the steps of scanning the area of the photosensor with a small spot of light of constant spectral distribution containing the wavelength of maximum absorption, and analyzing either the light reflected from or transmitted by the sample for changes in spectral distribution during scanning. The apparatus comprises means for mechanically scanning the area of the photosensor with a spot of light as defined in the method, and means for determining the $x$ and $y$ chromaticity coordinates of either the light reflected from or transmitted by the sample.

---

Figure 11:
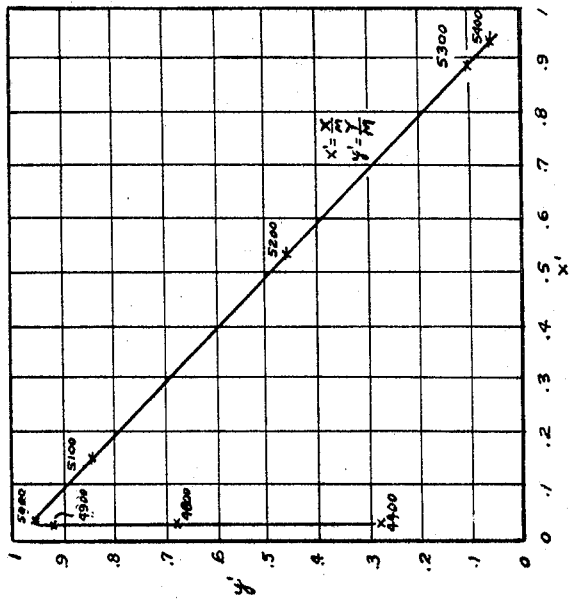

The invention described herein may be manufactured and used by or for the United States Government for governmental purposes without the payment to me of any royalty thereon.

In electronically scanned image pickup tubes for converting optical images into electrical signals where the brightness and contrast of the received image are extremely low, as in the case of the images of celestial bodies of very low brightness, it is important that the photosensitive target plate receiving the optical image have a high degree of spatial homogeneity in its spectral response, for any variation of the spectral response over the surface of the photosensor will appear as a spurious component in the electrical signal.

It is the purpose of this invention to provide apparatus for readily testing photosensitive target plates, both photoconductive and photoemissive, for image pick-up tubes prior to their installation in the tube to determine the degree of spatial uniformity in their spectral responses.

Briefly, this is accomplished by scanning successive elemental areas of the sample with light having a continuous energy distribution $E(\lambda)$ which includes the wavelength of maximum absorption of the photosensor material. The sample may be, for example, the photoconductor cadmium sulphide (CdS) in the form of a plate that is a single grown crystal or a plate cut from a larger crystal. The wavelength at which maximum absorption of light energy occurs is the wavelength corresponding to the energy gap between the valence and conduction bands of the material. For CdS this energy gap is approximately 2.5 electron volts, corresponding to a wavelength of approximately 5000 A.

That portion of the scanning light transmitted by, or reflected from, the sample is then analyzed for changes in its spectral distribution during the scanning process, any change in spectral distribution indicating a nonuniformity in the spectral response of the photosensor. This analysis is carried out by introducing the scanning light that is either transmitted through or reflected from the sample into a three-channel photosensor system in which the channels have different spectral responses $P'(\lambda)$, $P''(\lambda)$ and $P'''(\lambda)$ and from which there are three outputs X, Y and Z. These outputs have the following forms:

(1) $\qquad X = K_1 \int E(\lambda) S(\lambda) P'(\lambda) d\lambda$
(2) $\qquad Y = K_2 \int E(\lambda) S(\lambda) P''(\lambda) d\lambda$
(3) $\qquad Z = K_3 \int E(\lambda) S(\lambda) P'''(\lambda) d\lambda$ in which $S(\lambda)$ is the transmission or reflection of the scanning light by the sample as a function of the wavelength $\lambda$.

The quantities X, Y and Z are applied to an adder to derive their sum $M = X + Y + Z$. X and M and Y and M are then applied to ratio computers to derive the ratios (4) $$x' = \frac{X}{M}$$

and (5) $$y' = \frac{Y}{M}$$

Any change in the light from the sample that is independent of wavelength, such as a change in intensity by a factor that is the same for all wavelengths, multiplies X, Y and Z by the same factor and therefore does not change the values of $x'$ and $y'$. However, if the spectral distribution of the light energy from the sample changes during the scanning process, i.e., if $S(\lambda)$ changes, the changes produced in X, Y and Z are different because of the different functions $P'(\lambda)$, $P''(\lambda)$ and $P'''(\lambda)$. Consequently, the values of $x'$ and $y'$ change during the scanning process and these changes are indicative of a spatial nonuniformity in photoconductivity of the crystal as a function of wavelength.

In accordance with a preferred embodiment of the invention, the values of $x'$ and $y'$ are displaced on the screen of a cathode ray tube as a spot of light in a rectangular coordinate system and a photographic record is made of the spot position during the scanning process. The greater the range over which the values of $x'$ and $y'$ as represented by the spot position move the less is the spatial uniformity of the spectral response of the sample and the less suitable it is for use in an image tube. Other methods of recording the values of $x'$ and $y'$ may, of course, be used. Photoemissive target electrodes are tested in the same manner as photoconductive electrodes.

Figure 7:
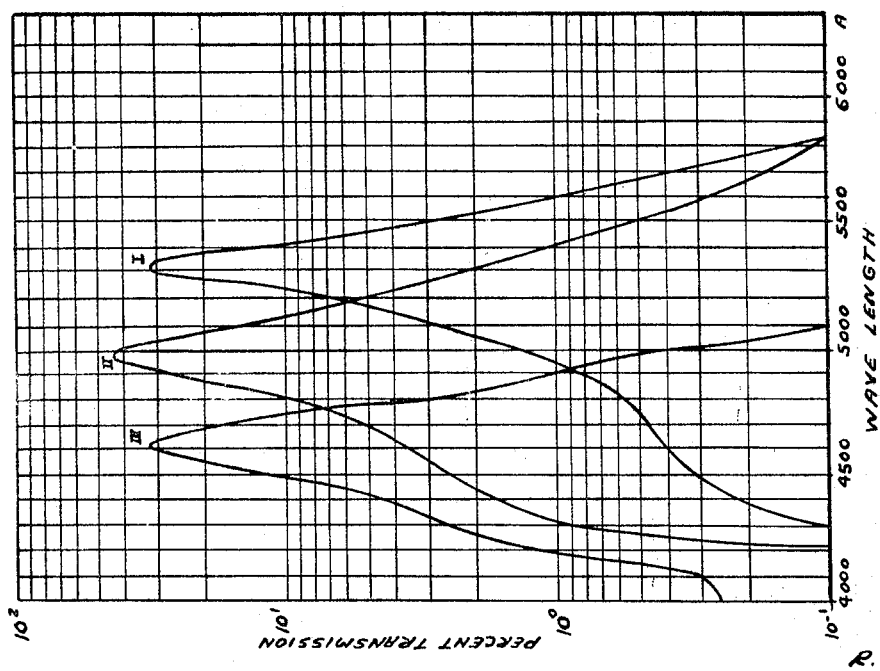
Figure 8:
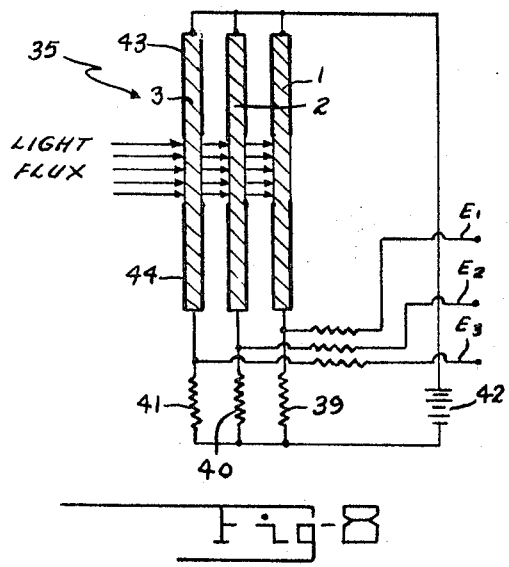
Figure 8A:
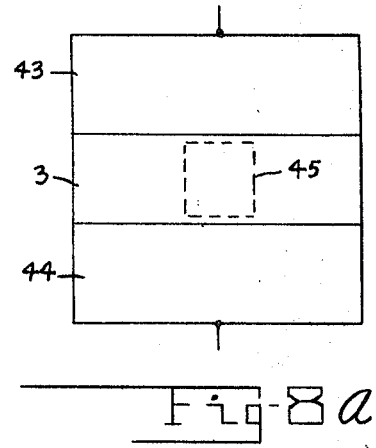
Figure 9:
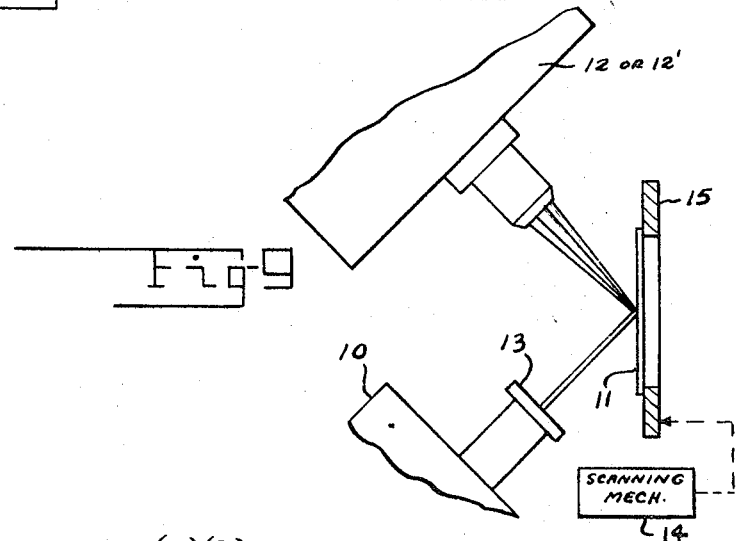
Figure 10:
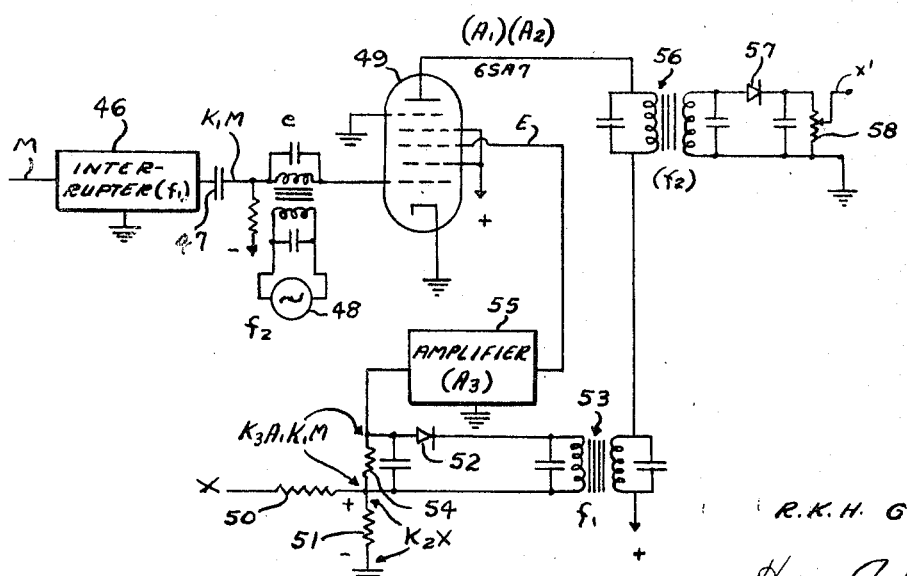

A more detailed description of the invention will be given with reference to the specific embodiments thereof shown in the accompanying drawings in which FIG. 1 is a block diagram of an analyzer in accordance with the invention, FIG. 2 shows a cathode ray tube screen as used in FIG. 1, FIG. 3 illustrates one form of the photosensor system of FIG. 1, FIG. 4 shows a method of forming the scanning aperture, FIG. 5 illustrates a method of supporting the sample under test during the scanning process, FIG. 6 shows an alternative form of the photosensor system of FIG. 1, FIG. 7 shows the transmission characteristics of the filters I, II and III of FIG. 3, FIGS. 8 and 8a illustrate the solid state photosensor 35 of FIG. 6, FIG. 9 illustrates the use of reflected rather than transmitted light in the testing process, FIG. 10 is a schematic diagram of a suitable ratio computer for use in FIG. 1, and FIG. 11 illustrates the locus of monochromatic radiation in the range 4400 A.–5400 A. as would be displayed by FIG. 1 using the photosensor system of FIG. 3.

Referring to FIG. 1, element 10 produces a small beam of light which passes through sample 11 under test and into a photoelectric system 12 or 12′ which contains three photosensors having different spectral responses. The output of the three photosensors are direct voltages designated X, Y and Z. A suitable scanning mechanism 14 serves to move the sample 11 relative to the beam of light and transversely thereof in such a way that the beam scans the sample an elemental area at a time.

The elements 10 and 12 are shown in more detail in FIGS. 3 and 6. The light source 10 provides an aperture in plate 13 through which the scanning beam of light emerges. The preferred form of the aperture is rectangular and for the closest investigations should be square, although slits may be used for preliminary scanning. A small square aperture may be formed by placing two slits at right angles as shown in FIG. 4. The sample 11 may be mounted on a frame 15 which is engaged by the scanning mechanism 14 as seen in FIG. 5. A suitable scanning pattern is illustrated in this figure where the path followed by the center of the aperture is shown by a dotted line.

The light source in element 10 may be a small incandescent lamp 16, preferably one in which the axis of the filament is straight. The axis of the filament should also be parallel to the sides of the aperture particularly where an elongated aperture or slit is used. In FIG. 3 the axis of the filament is normal to the paper and at the center of cylindrical reflector 17. Cylindrical lenses 18 and 19 serve to collimate the rays from the lamp so that the rays passing through the aperture and forming the scanning beam are substantially parallel. A filter 20 may be employed to correct the spectral distribution of the light produced by lamp 16. For example, the lamp 16 may have a color temperature of 2650° K., i.e., a spectral distribution equivalent to that produced by a black body radiator at 2650° K., whereas, for investigating a particular crystalline material, a color temperature of 5500° K. may be desired. This correction could be made by a suitable filter, such as the Corning Glass 78AA.

The light passing through the sample is admitted to the photoelectric system 12 of FIG. 3, or 12' of FIG. 6, through lens 21. Within the housing the light is applied to a photosensor system having three different spectral responses and three corresponding electrical outputs. In FIG. 3 the light is first split into two equal components by semitransparent mirror 22. The reflected component is directed toward opaque plate 23 by a front surface mirror 9. The transmitted component of mirror 22 is split into two equal components by semitransparent mirror 24. The transmitted component impinges upon opaque plate 25 and the reflected component is directed toward opaque plate 26 by front surface mirror 27. The optical paths between plates 23, 25 and 26 and lens 21 are equal, the lens serving to form on these plates an enlarged image of the aperture in plate 13. In order to increase the resolution, only the light from the center of the image is used and, for this purpose, plates 23, 25 and 26 are provided with small apertures similar to the aperture in plate 13. In this manner the effective size of the aperture in plate 13 is reduced by the amount of the magnification of lens 21. This permits the aperture in plate 13 to be large enough to avoid diffraction effects without sacrificing resolution. In this respect, the distance between horizontal scanning lines (FIG. 5) should be based on the effective size rather than the real size of the aperture in plate 13.

Neutral density filters 28, 29 and 30 and filters I, II and III have desired spectral responses as explained later are placed in front of plates 23, 25 and 26. The purpose of the neutral filters is to equalize the brightness of the images on the plates 23, 25 and 26, the principal correction being necessary at plate 23 where, for the beam splitting arrangement described above, the image would otherwise be about twice as bright as the images on plates 25 and 26. This equalization is made with filters I, II and III temporarily removed. The light passing through the apertures in plates 23, 25 and 26 enters photomultipliers 31, 32 and 33 which produce proportionate output voltages X, Y and Z.

The choice of filters I, II and III is governed by the material to be tested and in particular for photoconductors and photoemitters by the energy gap between the valence and the conduction bands, or, in other words, by the energy required to move an electron from the valence band to the conduction band. This energy gap is influenced somewhat by temperature and impurities present in the sample so that a precise figure cannot be given except for carefully specified conditions. For CdS, for example, it is approximately 2.5 electron volts, corresponding to a wavelength of about 5000 A. Maximum absorption of energy occurs at this wavelength. As the wavelength decreases from this value absorption of the light energy decreases and reflection increases, and as the wavelength increases above this value absorption decreases and transmission increases. The transmission peaks of the three filters should be about equally spaced in wavelength with considerable overlap of the transmission bands, the total transmission band, of course, including the wavelength corresponding to the above described energy gap, preferably near its center.

FIG. 7 shows suitable characteristics for filters I, II and III when the material to be tested is CdS. The wavelength 5000 A, the approximate gap wavelength for this material, is near the center of that portion of the spectrum covered by the filter combination. Filters of this type, covering various portions of the spectrum, are commercially available.

It is desirable that the outputs X, Y and Z, in the absence of a test sample and with filters I, II and III removed be substantially independent of $\lambda$ over the portion of the spectrum used in the analyzer. This can be achieved by arranging that the spectral response of the photocathodes in the photomultipliers compensate for the spectral distribution of the light emerging from the aperture in plate 13. For light at a color temperature of 5500° K. the energy increases slightly with $\lambda$ in the 4000–6000 A. region. The response of an S11 photocathode generally decreases slightly in this region. The combination of the two therefore results in an approximately uniform response.

The voltages X, Y and Z obtained in FIG. 3 are represented by previously given Equations 1, 2 and 3. Where $E(\lambda)$ and the spectral response of the photocathodes in the photomultipliers complement each other, as explained above, the functions $P'(\lambda)$, $P''(\lambda)$ and $P'''(\lambda)$ are provided by the filters I, II and III respectively. Where this complementary relationship does not exist, these functions are the combination of the filter characteristics with response characteristic of the photomultiplier photocathodes.

Another photoelectric system 12' which may be substituted for the system 12 in FIG. 3 is shown in FIG. 6. As in FIG. 3 lens 21 forms on plate 34 an enlarged image of the aperture in plate 13 (FIG. 3). Plate 34, like plates 23, 25 and 26 in FIG. 3, has an aperture at the center of the image through which light passes to solid state photosensor device 35. This device has three photosensor channels with different spectral characteristics which produce output voltages $E_1$, $E_2$ and $E_3$. These voltages are amplified in amplifiers 36, 37 and 38 to produce outputs X, Y and Z, as in FIG. 3.

Details of the solid state photosensor 35 are shown in FIG. 8. The light flux from the sample passes successively through photoconductors 3, 2 and 1 having different absorption peaks positioned in the spectrum in a manner similar to the transmission peaks of filters III, II and I of FIG. 3. The absorption peak of the photoconductor occurs at the wavelength corresponding to the energy gap between the valence and conduction bands of the material, as previously stated. Maximum absorption of light occurs at this wavelength and the photoconductor has its maximum conductance. Since reflection of light occurs below the gap wavelength of the photoconductor and transmission above this wavelength, the photoconductors in the cascade should be arranged in the order of increasing gap wavelength. Accordingly, photoconductor 3 may be made of zinc selenide (ZnSe) having an energy gap and corresponding wavelength of approximately 2.6 electron volts and 4750 A, photoconductor 2 may be made of cadmium sulphide (CdS) having an energy gap and corresponding wavelength of approximately 2.5 electron volts and 5000 A, and photoconductor 1 may be made of zinc telluride (ZnTe) having an energy gap and corresponding wavelength of approximately 2.1 electron volts and 5900 A. In this case, the absorption characteristics Pof photoconductors, 1, 2 and 3 provide the functions $P'(\lambda)$, $P''(\lambda)$ and $P'''(\lambda)$ of Equations 1, 2 and 3.

The three photoconductors are connected in series with load resistors 39, 40 and 41 across direct current source 42, the voltages developed across these resistors constituting the output voltages $E_1$, $E_2$ and $E_3$. In order to connect the photoconductors into the electric circuits, electrodes such as 43 and 44 may be plated on them as shown in FIGS. 8 and 8a. Only so much of the photoconductive plate is left exposed as to accommodate the area of light 45 received from the aperture in plate 34 (FIG. 6). As stated earlier, this aperture may be square, as shown, or an enlongated rectangle and for this reason the exposed portion of the plate is dimensioned to accommodate either.

The sample 11 may be analyzed by reflected light instead of by transmitted light as in FIG. 3. A suitable arrangement is shown in FIG. 9. A small area of the sample is illuminated with collimated light from source 10. This area may be similar in size and shape to the illuminated area in FIG. 3. Light reflected from this area is collected by the lens of photosensor system 12 or 12'. The operation is otherwise the same as described for FIGS. 3 and 6. Since, as stated earlier, wavelengths shorter than the energy gap wavelength of the sample are reflected and those larger are transmitted, variations during the scanning process in the spectral distribution of the reflected light, as well as such variations in the transmitted light, indicate spatial nonuniformity in the spectral response of the sample.

Returning to FIG. 1, the direct output voltages X, Y and Z of the photosensor system 12 or 12' are applied to adder 46 which produces an output voltage M proportional to their sum. The voltage X and the sum M are then applied to ratio computer 47 to produce the voltage $x'$ proportional to the ratio $X/M$. Similarly, ratio computer 48 produces a voltage $y'$ proportional to the ratio $Y/M$. Commercial devices for deriving these ratios are readily available. FIG. 10 is an example of one suitable circuit for this purpose.

Referring to FIG. 10, the voltage M is converted by interrupter 46 and capacitor 47 into an alternating voltage $k_1M$ of frequency $f_1$ which is applied along with alternating voltage $e$ of frequency $f_2$, derived from source 48, to the control grid of tube 49 the amplification factor of which may be controlled by varying the direct voltage E on its third grid. The direct voltage X is applied to a potential divider 50–51 producing a voltage $k_2X$ across resistor 51. The output of tube 49 at frequency $f_1$ is coupled to rectifier 52 through transformer 53 tuned to $f_1$. The output of this rectifier, developed across resistor 54, has the value $k_3A_1k_1M$, where $A_1$ is the gain of the tube 49 stage at $f_1$. The difference between the voltages across resistors 51 and 54 is amplified by amplifier 55 having gain $A_3$ to produce the gain control voltage E. The output of tube 49 at frequency $f_2$ is coupled by transformer 56, tuned to $f_2$, to rectifier 57 which produces the output voltage $x'$ at potentiometer resistor 58.

The principle of operation of the circuit of FIG. 10 is to make the gain of stage 49 proportional to $X/M$ and, since $e$ is constant, $x'$ will then be a constant times the gain or a constant times $X/M$. This may be seen from the following equations:

(6) $$E = (k_2X - k_3A_1k_1M)A_3$$

Rearranging (6), (7) $$A_1 = \frac{k_2X - \frac{E}{A_3}}{k_3k_1M}$$

If $A_3$ is made very high, the term $E/A_3$ approaches zero, since E is relatively small, and the expression for $A_1$ becomes (8) $$A_1 \frac{k_2X}{k_3k_1M}$$

Since the gain $A_2$ of stage 49 at $f_2$ is a constant times the gain $A_1$ at $f_1$ (9) $$A_2 \frac{k_4k_2X}{k_3k_1M}$$

(10) $$x' = eA_2k_5 \frac{ek_5k_4k_2X}{k_3k_1M}$$

Since $e$ is a constant,

(11) $$x' \approx K\frac{X}{M}$$

The voltage $y'$ is obtained in a similar manner.

Returning to FIG. 1, the voltages $x'$ and $y'$ are applied to the horizontal and vertical deflection plates, respectively, of electrostatically deflected cathode ray tubes 59 and 60. The tubes' screens may be fitted with graticules, as shown in FIG. 2, to indicate the values of $x'$ and $y'$ by the position of the spot of light produced by the beam. The potentiometer system 61 is used to adjust the beam spot to the zero position when $x'$ and $y'$ are zero. The displays on the two screens are identical. Sequence camera 62 is used to record the movement of the spot on the screen of tube 59 during the scanning of the sample, while tube 60 is used for simultaneous direct viewing. Any other suitable form of $x$, $y$ recorder 7 may be used if desired.

FIG. 11 shows the locus of monochromatic radiations in the 4400–5400 A. range such as would be obtained in FIG. 1 by introducing monochromatic radiations of the wavelengths indicated successively into the photosensor system, i.e., through the aperture in plate 13 (FIG. 3) with the sample removed. The locus in FIG. 11 is for photosensor system 12 (FIG. 3) and the filters of FIG. 7. If photosensor system 12' (FIGS. 6 and 8) were employed, the locus would be similar but not identical to that in FIG. 11 since the photoconductor characteristics are similar to but do not exactly match the characteristics obtained with the filters I, II and III in the system of FIG. 3.

The testing operation consists in scanning the sample in the described manner and observing and/or recording the movement of the beam spot on the cathode ray tube screen, thus, in effect, observing the changes, if any, in the values of $x'$ and $y'$. The values of $x'$ and $y'$ will change only if there is a change in the spectral distribution of the light energy received from the sample since any variation of the light energy by a factor that is the same for all wavelengths will affect X, Y and Z, the outputs of the photosensor system, equally and therefore will not change the ratio of X or Y to $X+Y+Z$. A perfectly homogeneous crystal will produce no change in the spectral composition of the transmitted or reflected light during the scanning process and, therefore, the less the movement of the beam spot during the test the more nearly is the sample free of spatial inhomogeneities. Consequently, the quality of the sample for use as the sensing element in an image pickup tube is in inverse relation to the range of the movement of the beam spot on the cathode ray tube screen that occurred during the test. Acceptable limits may be established so that samples unfit for picture tube use may be readily recognized.

I claim:

1. Apparatus for determining the spatial deviation in the spectral response of a photoelectric optical image receiving plate over its image receiving area, comprising: means for scanning the plate area with a small spot of light having a continuous spectral distribution over a wavelength band that includes near its center the wavelength of maximum absorption by the plate; three photoconductors each connected in series with a load resistor across a source of direct voltage, said photoconductors having different spectral responses within said wavelength band, each response overlapping the other two within the band and peaking at a different wavelength in the band; means for passing the scanning light that is transmitted through said plate through said photoconductors in succession in the order of increasing values of the wavelength at which maximum conduction occurs; adding means having inputs coupled to said load resistors for producing at its output a voltage proportional to the sum of the voltages across said load resistors; means coupled to two of said load resistors and to the output of said adding means for producing a voltage $x'$ proportional to the ratio of the voltage across one of said load resistors to said sum voltages and a voltage $y'$ proportional to the ratio of the voltage across the other of said two load resistors to said sum voltage; and means for displaying on a rectangular coordinate system the loci of the points represented by the concurrent values of $x'$ and $y'$ as rectangular coordinates.

2. Apparatus for determining the spatial deviation in the spectral response of a photoelectric optical image receiving plate over its image receiving area, comprising: means for scanning the plate area with a small spot of light formed by collimated rays striking the plate at an angle of incidence greater than zero, said light having a continuous spectral distribution over a wavelength band that includes near its center the wavelength of maximum absorption by the plate; three photoconductors each connected in series with a load resistor across a source of direct voltage, said photoconductors having different spectral responses within said wavelength band, each response overlapping the other two within the band and peaking at a different wavelength in the band; means for passing the scanning light that is reflected from said plate through said photoconductors in succession in the order of increasing values of the wavelength at which maximum conduction occurs; adding means having inputs coupled to said load resistors for producing at its output a voltage proportional to the sum of the voltages across said load resistors; means coupled to two of said load resistors and to the output of said adding means for producing a voltage $x'$ proportional to the ratio of the voltage across one of said load resistors to said sum voltage and a voltage $y'$ proportional to the ratio of the voltage across the other of said two load resistors to said sum voltage; and means for displaying on a rectangular coordinate system the loci of the points represented by the concurrent values of $x'$ and $y'$ as rectangular coordinates.

3. The method of testing a photoelectric optical image receiving plate, prior to its installation in an image pickup tube, for spatial uniformity in spectral response over its image receiving area comprising the steps of scanning the image area with a small spot of light having a continuous spectral distribution over a wavelength band that includes near its center the wavelength of maximum absorption of the plate, and analyzing the light transmitted through said plate for changes in its spectral distribution during the scanning process, the analysis comprising the steps of multiplying said transmitted light by three factors that are different overlapping functions of wavelength to form three products, deriving two ratios by dividing each of two of said products by the sum of the three products, and displaying in a rectangular coordinate system the locus of the points corresponding to the concurrent values of said two ratios as rectangular coordinates.

4. The method of testing a photoelectric optical image receiving plate, prior to its installation in an image pickup tube, for spatial uniformity in spectral response over its image receiving area comprising the steps of scanning the image area with a small spot of light having a continuous spectral distribution over a wavelength band that includes near its center the wavelength of maximum absorption of the plate, and analyzing the light reflected from said plate for changes in its spectral distribution during the scanning process, the analysis comprising the steps of multiplying said reflected light by three factors that are different overlapping functions of wavelength to form three products, deriving two ratios by dividing each of two of said products by the sum of the three products, and displaying in a rectangular coordinate system the locus of the points corresponding to the concurrent values of said two ratios as rectangular coordinates.

References Cited

UNITED STATES PATENTS

| 2,186,268 | 1/1940 | Pakala | 346—110 X |
| 2,406,166 | 8/1946 | Scott. | |
| 2,475,387 | 7/1949 | Golden | 346—110 X |
| 3,060,790 | 10/1962 | Ward. | |
| 3,112,360 | 11/1963 | Gregg | 250—227 X |
| 3,314,327 | 4/1967 | Killpatrick et al. | |
| 2,811,890 | 11/1957 | Wadey. | |
| 2,938,424 | 5/1960 | Herriott | 356—178 |
| 3,003,388 | 10/1961 | Hunter et al. | 356—176 |
| 3,244,062 | 4/1966 | Sweet | 356—203 |
| 3,315,229 | 4/1967 | Smithline | 356—39 X |

RONALD L. WIBERT, Primary Examiner

W. A. SKLAR, Assistant Examiner

U.S. Cl. X.R.

356—178, 186, 203, 206